United States Patent Office 3,674,473
Patented July 4, 1972

3,674,473
CUMULENE CONTAINING PHOTOCONDUCTIVE BINDER ELEMENTS FOR USE IN ELECTROPHOTOGRAPHY
Robert G. Blanchette, Elk Grove, Ill., assignor to Addressograph-Multigraph Corporation, Cleveland, Ohio
No Drawing. Continuation-in-part of application Ser. No. 771,352, Oct. 28, 1968. This application Oct. 6, 1970, Ser. No. 78,628
Int. Cl. G03g 5/06
U.S. Cl. 96—1.5
9 Claims

ABSTRACT OF THE DISCLOSURE

A photoelectrostatic member is prepared by applying a photoconductive layer containing a compound selected from the general class of cumulenes dispersed in a resin binder. The cumulene compounds useful in the instant invention have one of the following general formulas:

$$Q_1=(C=)_n=Q_2$$

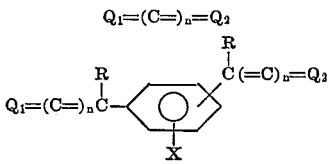

where X represents an alkyl, hydrogen, halogen, or nitro substituent; $Q_1$ and $Q_2$ can be:

indene, or fluorene; $n$ can be an integer from 1 through 6; R is lower alkyl, aryl or hydrogen; $R_1$ and $R_2$ can be aryl, substituted aryl, heterocyclic ring structures; and wherein $Q_1$, $Q_2$, or $R_1$, and $R_2$ can be the same or different.

This application is a continuation-in-part of application Ser. No. 771,352, filed Oct. 28, 1968, and now abandoned.

BACKGROUND OF THE INVENTION

This invention relates to organic photoconductive materials and, more particularly, to a class of compounds known as cumulenes which contain a unit of $n$ carbon atoms with $(n-1)$ double bonds between them, where $n$ is an integer equal to or greater than 3.

Photoelectrostatic imaging processes involve the use of a photoconductive medium which is charged in the dark, exposed to a pattern of light and shadow thereby producing a charge pattern corresponding to the image portions of the original design to be reproduced. This charge pattern is then developed by applying an electrostatically attractable powder generally known as toner in this art. The photoconductive medium usually comprises a conductive support to which has been applied a photoconductive layer or film in which the active photoconductive material is selenium, zinc oxide, or an organic compound. A wide variety of organic photoconductive materials are known and have been suggested, some of which are polymeric in nature and in themselves form a uniform continuous photoconductive film. Other types of organic photoconductive compounds can be used which are crystalline and therefore lend themselves to being dispersed through organic resin binders and applied to a conductive support.

SUMMARY OF THE INVENTION

In accordance with the present invention a new class or organic photoconductors is provided having any one of the following general formulas:

$$Q_1=(C=)_n=Q_2$$

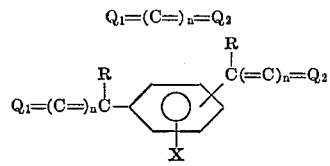

where X represents an alkyl, hydrogen, halogen or nitro substituent; $Q_1$ and $Q_2$ can be:

indene, or fluorene; $n$ can be an integer from 1 through 6; R is a lower alkyl, aryl or hydrogen; $R_1$ and $R_2$ can be aryl, substituted aryl, heterocyclic ring structures, fused arenic ring structures; and $Q_1$, $Q_2$, or $R_1$, and $R_2$ can be the same or different, said compound being dispersed in a resin binder.

The support on which the photoconductive material is applied may be paper which has been treated to render it conductive or it can be metal or metal foil such as aluminum, copper, or zinc. Generally, it is understood in this art that the base support must have a conductivity in the range from $10^{-11}$ mhos. per centimeter to the conductivity of metal.

It is the general object of the present invention to provide an improved organic photoconductive medium formulated with compounds which contain a unit of $(n)$ carbon atoms with $(n-1)$ double bonds between them where $(n)$ is an integer equal to or greater than 3.

It is another object of this invention to provide a photoconductive material comprised of organic crystalline materials selected from the general class of cumulenes.

It is still another object of this invention to provide a photoconductive member formulated with an organic crystalline material dispersed in an insulating resin binder which formulation is simple to prepare and which photoconductive member gives an increased photo response.

DESCRIPTION OF THE INVENTION

Compounds which are typical of the cumulene-type materials useful in the preparation of the photoconductive members of this invention are the following:

| List of compounds formula | Name |
|---|---|
| 1. (structure) | Biflourenylidene-ethylene. |
| 2. (structure) | Tetraphenyl-hexapentaene. |
| 3. (structure) | Tetraphenyl-butatriene. |
| 4. (structure) | Tetra-(m-bromophenyl) hexapentaene. |
| 5. (structure) | Bis(3,6-dinitroflourenylidene) ethylene. |
| 6. (structure) | 1,4 bis(1,1-diphenyl-4-ethyl-4-butatrienyl)benzene. |
| 7. (structure) | 1,4-diphenyl-1,4-di-2-thienylbutatriene. |
| 8. (structure) | 1-(inden-1-ylidene)-3-diphenyl-propadiene. |
| 9. (structure) | 1,4-bis(1,1-di-4-bromophenyl-4-phenyl-4-butatrienyl)benzene. |

TABLE—Continued

| List of compounds formula | Name |
|---|---|
| 10. [structure] | 1,4-bis(1,1-diphenylbutatrienyl)-2-nitrobenzene. |
| 11. [structure] | Tetraphenylpentatetraene. |
| 12. [structure] | 1,4-di(3-methylphenyl)-1,4-diphenylbutatriene. |
| 13. [structure] | 1,4-diphenyl-1,4-di(4-phenylphenyl)butatriene. |
| 14. [structure] | 1,4-di-2-naphthyl-1,4-diphenylbutatriene. |
| 15. [structure] | 1,4-di(2,4-dimethylphenyl)-1,4-diphenylbutatriene. |
| 16. [structure] | 1,4-di(2,5-dimethylphenyl)-1,4-diphenylbutatriene. |
| 17. [structure] | 1,4-di(3,4-dimethylphenyl)-1,4-diphenylbutatriene. |
| 18. [structure] | 1,4-di(2-methylphenyl)-1,4-diphenylbutatriene. |
| 19. [structure] | 1,4-di(4-fluorophenyl)-1,4-diphenylbutatriene. |
| 20. [structure] | 1,4-diphenyl-1,4-di(3-phenylphenyl)butatriene. |

TABLE—Continued

| List of compounds formula | Name |
| --- | --- |
| 21. F₃C−(C₆H₄)(C₆H₄)−C=C=C=C−(C₆H₄)(C₆H₄)−CF₃ | 1,4-diphenyl-1,4-di(3-trifluoromethylphenyl)butatriene. |
| 22. (C₆H₅)−(C₆H₄)−(C₆H₄)(C₆H₄)−C=C=C=C−(C₆H₄)(C₆H₄)−(C₆H₅) | 1,4-diphenyl-1,4-di-p-terphenylylbutatriene. |

The photoconductive crystalline materials of this invention can be prepared by a number of well-known methods as described in the following references: Chapter 13, "Cumulenes," by H. Fisher, "The Chemistry of Alkenes," S. Patai, ed., Interscience Publishers, London, New York, Sydney, 1964, page 1025; "Cumulenes," Cadiot, Chodkiewicz, and Rauss Godineau, Bulletin of the Chemical Society of France, 2126, (1961).

The preparation of the cumulenes of this invention such as, for example, 1,1,4,4-tetraphenylbutatriene, may be accomplished by the reduction of the appropriately substituted 1,1,4,4-tetraphenylbutynediol obtained from the reaction of a benzophenone and acetylene, with potassium iodide and sulphuric acid. The symmetrically substituted hexapentaenes may be obtained by potassium hydroxide-acetic acid anhydride condensation of 1,1,diphenylpropargyl alcohol. The compound 1,2-bifluorenylidene-ethylene may be obtained by the treatment of 9-bromomethylenefluorene with potassium amide in liquid ammonia as described by Hauser and Lednicer, Journal of Organic Chemistry, 22, page 1248 (1957).

Photoelectrostatic members of this invention may be prepared by mixing the particulate crystalline material in a suitable solvent such as chlorobenzene, toluene, methylene, chloride, or tetrahydrofuran with a suitable resin. The mixture is then ball milled for sufficient time until complete uniform blending of all the ingredients is accomplished. This usually requires anywhere from 15–24 hours. Such film forming resins as polyvinyl acetate, polyvinyl ethers, polystyrene, alkyd resins, phenylformaldehyde resins, styrene-butadiene copolymers, and polyamide resins may be employed as binders. The resin binder may comprise from 10%–75% by weight of the total weight of solids present in the photoconductive layer.

After the mixture is ball milled it is applied to a suitably conductive substrate by conventional coating techniques such as a meniscus coater, a wire wound rod or doctor blade at the rate of 0.5 gram to 2.0 grams per square foot, preferably 0.5 to 1 gram per square foot to produce a film thickness in the range of 0.1 mil to 5.0 mils in thickness, preferably in the range of 0.2 to 0.5 mil thickness. Evaporation of the solvent may be carried out by passing the coated web material through a forced air oven-type dryer.

It is generally known in the art dealing with the prepparation of photoconductive members, whether they are of the inorganic or organic type, that the photoresponse of such members may be improved through the addition of certain sensitizers or additives. In the case of inorganic photoconductive materials such as zinc oxide, these additives are in the form of dyes which increase the photoresponse by the mechanism of extending the spectral response of the photoconductive member. In the case of organic photoconductors involving donor-acceptor type materials or charge transfer type systems, the use of additives tends to extend the spectral response range or shift the spectral sensitivity into the visible portion of the spectrum and also tends to increase the sensitivity in a given spectral sensitivity range and thereby achieving a more efficient system.

It should be pointed out that the photoconductive materials of the instant invention exhibit the property of photoconductivity independent of the use of such additives or in fact independently of resin binders with which they may be combined. Such photoconductivity is determined by measuring the photocurrent of the materials coated on nesa glass surface cells or electrodes. The current which results, results when the charged nesa glass surface cell, which is coated with the specific chemical compound in a suitable solvent and evaporated to dryness, is illuminated with electromagnetic radiation represents the photocurrent. When referring to nesa glass surface cell measurement, the photoresponse is indicated in terms of the ratio of the photocurrent which results upon illumination of electromagnetic radiation to the dark current values.

Photoresponse of the compounds of the instant invention respond to radiation in the range of 375 to 600 millimicrons. While the compounds may be used to advantage without the use of sensitizers in this range of sensitivity to electromagnetic radiation, it is desirable to increase the degree of photoresponse and/or extend the range of the spectral response. The organic photoconductors of the instant invention when measured on a nesa glass surface cell, exhibit a ratio of photocurrent to dark current in the range of 30 to 1000.

The cumulenes as a class of photoconductors exhibit an increase in photoresponse upon the addition of certain additives which are chemical sensitizers such as π-type acids such as disclosed in copending application Ser. No. 679,246, now abandoned, and Ser. No. 707,413, now U.S. Patent 3,446,785, filed in the name of Evan S. Baltazzi, which inventions are assigned to the same assignee as the instant invention.

The following list of π-type sensitizers is representative of compounds of the dicyanomethylene fluorene type and the butenolides.

9-(dicyanomethylene)-3-nitrofluorene
9-(dicyanomethylene)-2,4-dinitrofluorene
9-(dicyanomethylene)-2,4,7-trinitrofluorene
9-(dicyanomethylene)-2,5-dinitrofluorene
9-(dicyanomethylene)2,6-dinitrofluorene
9-(dicyanomethylene)-2,7-dinitrofluorene
9-(dicyanomethylene)-2,4,5,7-tetranitrofluorene
9-(dicyanomethylene)-3,6,-dinitrofluorene
9-(dicyanomethylene)-2,4-dicyanofluorene
9-(dicyanomethylene)-2,4,7-tricyanofluorene
9-(dicyanomethylene)-2,4,5,7-tetracyanofluorene
9-(dicyanomethylene)-2,4-ditrifluoromethylfluorene
9-(dicyanomethylene)-2,4,7-tritrifluoromethylfluorene
9-(dicyanomethylene)-2,4,5,7-tetratrifluoromethylfluorene
9-(dicyanomethylene)-2,4-dimethylfluorene
9-(dicyanomethylene)-2,4,7-trimethylfluorene
9-(dicyanomethylene)-2,4,5,7-tetramethylfluorene
9-(dicyanomethylene)-2,4-dibutoxyfluorene
9-(dicyanomethylene)-2,4,7-tributoxyfluorene
9-(dicyanomethylene)-2,4,5,7-tetrabutoxyfluorene 9-(dicyanomethylene)-2,4-dichlorofluorene
9-(dicyanomethylene)-2,4,7-trichlorofluorene
9-(dicyanomethylene)-2,4,5,7-tetrachlorofluorene
2-phenyl-4(9-fluorenylidene)-5-oxazolone
2-phenyl-4(2,4-dinitro-9-fluorenylidene)-5-oxazolone
2-phenyl-4(2,4,7-trinitro-9-fluorenylidene)-5-oxazolone
2-phenyl-4(2,5-dinitro-9-fluorenylidene)-5-oxazolone
2-phenyl-4(2,6-dinitro-9-fluorenylidene)-5-oxazolone
2-phenyl-4(2,7-dinitro-9-fluoroenylidene)-5-oxazolone
2-phenyl-4(2,4,5,7-tetranitro-9-fluorenylidene)-5-oxazolone
2-phenyl-4(3,6-dinitro-9-fluorenylidene)-5-oxazolone
2-phenyl-4(2,4-dicyano-9-fluorenylidene)-5-oxazolone
2-phenyl-4(2,4,7-tricyano-9-fluorenylidene)-5-oxazolone
2-phenyl-4(2,4,5,7-tetracyano-9-fluorenylidene)-5-oxazolone
2-phenyl-4(2,4-di-trifluoromethyl-9-fluorenylidene)-5-oxazolone
2-phenyl-4(2,4-dichloro-9-fluorenylidene)-5-oxazolone
2-phenyl-4(2,4,7-trichloro-9-fluorenylidene)-5-oxazolone
2-phenyl-4(2,4,5,7-tetrachloro-9-fluorenylidene)-5-oxazolone
$\alpha$-(9-fluorenylidene)-$\gamma$-phenyl-$\Delta^{\beta}_{1}\gamma$-butenolide
$\alpha$-(2,4-dinitro-9-fluorenylidene)-$\gamma$-phenyl-$\Delta^{\beta}_{1}\gamma$-butenolide
$\alpha$-(2,4,7-trinitro-9-fluorenylidene)-$\gamma$-phenyl-$\Delta^{\beta}_{1}\gamma$-butenolide
$\alpha$-(2,5-dinitro-9-fluorenylidene)-$\gamma$-phenyl-$\Delta^{\beta}_{1}\gamma$-butenolide
$\alpha$-(2,6-dinitro-9-fluorenylidene)-$\gamma$-phenyl-$\Delta^{\beta}_{1}\gamma$-butenolide
$\alpha$-(2,7-dinitro-9-fluorenylidene)-$\gamma$-phenyl-$\Delta^{\beta}_{1}\gamma$-butenolide
$\alpha$-(2,4,5,7-tetranitro-9-fluorenylidene)-$\gamma$-phenyl-$\Delta^{\beta}_{1}\gamma$-butenolide
$\alpha$-(3,6-dinitro-9-fluorenylidene)-$\gamma$-phenyl-$\Delta^{\beta}_{1}\gamma$-butenolide
$\alpha$-(2,4-dicyano-9-fluorenylidene)-$\gamma$-phenyl-$\Delta^{\beta}_{1}\gamma$-butenolide
$\alpha$-(2,4,7-tricyano-9-fluorenylidene)-$\gamma$-phenyl-$\Delta^{\beta}_{1}\gamma$-butenolide
$\alpha$-(2,4,5,7-tetracyano-9-fluorenylidine)-$\gamma$-phenyl-$\Delta^{\beta}_{1}\gamma$-butenolide
$\alpha$-(2,4-ditrifluoromethyl-9-fluorenylidene)-$\gamma$-phenyl-$\Delta^{\beta}_{1}\gamma$-butenolide
$\alpha$-(2,4-dichloro-9-fluorenylidene)-$\gamma$-phenyl-$\Delta^{\beta}_{1}\gamma$-butenolide
$\alpha$-(2,4,7-trichloro-9-fluorenylidene)-$\gamma$-phenyl-$\Delta^{\beta}_{1}\gamma$-butenolide
$\alpha$-(2,4,5,7-tetrachloro-9-fluorenylidene)-$\gamma$-phenyl-$\Delta^{\beta}_{1}\gamma$-butenolide In addition to the sensitizers referred to above, a large number of substances are disclosed in U.S. Patent 3,037,861, issued to Helmut Hoegl et al., dated June 5, 1962, which discloses compounds from the class of mineral acids, organic sulfonic acids, organic phosphonic acids, nitrophenols, acid anhydrides, metal halides of the metals and metaloids of the groups 1 B-2 through group 8 of the periodic system, boron halide compounds, organic substances containing CO-groups which are substantially monomeric, aldehydic compounds and ketonic materials.

The mechanism by which these additives enhance or increase the photoresponse is not fully understood. Reference to increase in photoresponse of the photoconductive materials when applied in a uniform film to a paper substrate may be defined in terms of the rate of voltage drop $dv/dt$ as a function of voltage. It is this measured rate of voltage drop, which when compared to photoconductive members without sensitizers, is increased over the same range of electromagnetic radiation which can vary from 360 millimicrons to 700 millimicrons.

The photosensitivity of the members of the instant invention may be defined in terms of a conventional zinc oxide resin binder photoconductive member. The photosensitivity of the latter for the purpose of this invention is generally been assigned the arbitrary numerical rating of 150 units representing the standard or normal photoresponse when such exposure is accomplished using a tungsten-type filament source.

The sensitivity of the members of this invention which did not include the $\pi$-type acids received a rating of 1.0 relative to the standard zinc oxide member.

The photoelectrostatic members to which had been added the $\pi$-type acids and which were exposed to a tungsten filament type lamp received a photosensitivity rating in the range of 80 to 210 units on this scale of comparison. In all cases the developed images which are obtained using the instant photoconductive members are of high contrast and good image density.

The amount of sensitizer employed may range from 0.1 to 5.0 moles per hundred moles of organic photoconductor. The preferred amount of sensitizer being between 0.5 to 1.5 moles per hundred moles of organic photoconductor. A typical sensitizer that may be used is 9-(dicyanomethylene)-2,4,7-trinitrofluorene.

The process of making a reproduction utilizing the photoelectrostatic member of this invention involves applying a sensitizing electrostatic charge to the photoconductive layer in the range of 200 to 1000 volts by means of a corona discharge electrode which is connected to a high potential source of from 4000 to 7000 volts. The materials of this invention may be charged either positively or negatively but exhibit a marked increase in sensitivity when charged positively. The charged layer upon receiving electrostatic charge in the dark, becomes sensitive to electromagnetic radiation and is then exposed to a pattern of light and shadow by directing the radiation through a light transmitting original which is placed in contact over the photoconductive layer or by illuminating a graphic original with suitable electromagnetic radiation and then projecting the reflected pattern of light and shadow through a lens system onto the photoelectrostatic member.

Exposing the photoconductive layer to a pattern of light and shadow produces a corresponding electrostatic image with the charged area corresponding to the shadow portions and in the light struck areas the charge is dissipated. The charged pattern or image is rendered visible by the application of a suitable toner which adheres to the image portions. Positively oriented toners are generally employed where the sensitizing charge is negative and reversal oriented toners are used for positively charged members, both systems producing a positive print from a positive original. The make-up of these toners is generally well known in the art and need not be further described here.

The material image is then fixed directly on the member or it may be transferred under controlled conditions to a receiving sheet, such as plain paper, and then fixed. The material image may be fixed by exposing the toner to a source of heat which causes the material to coalesce and fuse to support. In the circumstance that the toners are pressure responsive, they can be fixed by the application of pressure such as passing the members between the set of pressure rollers.

The following examples are presented for illustrating the present invention without limiting the scope thereof.

Example I

A photoelectrostatic member was prepared by mixing 10 grams of bifluorenylidene ethylene and 10 grams of styrenebutadiene copolymer sold by Goodyear Tire and Rubber Company under the tradename "Pliolite S5D" in 80 grams of toluene. The mixture was ball milled at room temperature until complete blending was achieved requiring approximately 18 to 24 hours. The mix was then applied to a suitable conductive support material such as aluminized Mylar—5 mil thickness using conventional coating equipment such as a meniscus coater or a wire wound rod. The solution was applied at a rate sufficient to produce a photoconductive layer of about 0.2 to 0.3 mil in thickness after the evaporation of the solvent. The coating weight was 0.5 gram per square foot. Evaporation of the toluene from the solution is accomplished by passing the coated web through forced hot air ovens maintained between 90° C. to 135° C.

The resulting member was charged positively and exposed to a pattern of light and shadow producing a latent electrostatic image thereon which was then developed by the application of a suitable electroscopic powder or toner. The photoresponse of the photoelectrostatic member was rated about 1.0 since the electrophotographic member was not sensitized.

Example II

The photoelectrostatic member of this example was prepared following the formulations of Example I with the exception that tetraphenylhexapentaene was substituted for the bifluorenylidene-ethylene and the mixture was applied at a rate sufficient to produce a photoconductive layer of 1 mil in thickness having a coating weight of about two grams per square foot.

It should be pointed out that both of the photoconductive members prepared in accordance with Examples I and II did not include the π-type acid materials and therefore were of relatively low light sensitivity being rated on the empirical scale as having a photosensitivity of 1.0 unit.

Example III

The formulation of this example follows the preparation of Example I with the exception that to the mixture prior to ball milling there is added 0.082 gram ($0.24 \times 10^{-3}$ moles) of 9 - (dicyanomethylene) - 2,4,7 - trinitrofluorene for the purpose of increasing the photoresponse of the photoconductive layer. 0.082 gram represent 0.8 mole per 100 moles of the photoconductor employed. The resulting electrophotographic member was responsive to electromagnetic radiation such as produced by a conventional tungsten filament tubular lamp such as sold by General Electric identified as their T-3 series lamps.

The photoresponse of the instant example was rated as 150 units. This means that the photoresponse was equivalent to that of a zinc oxide photoconductive member.

Example IV

A photoconductive coating formulation was prepared by blending 5 grams (0.0142 mole) of tetraphenylbutatriene and 15 grams of polyvinyl formal available from the Polysciences, Inc. of Rydal, Pa. The materials were mixed with 80 grams of chlorobenzene. To this mixture was added 0.05 gram of 9-(dicyanomethylene)-2,4,7-trinitrofluorene. The amount of additive for the purpose of extending the photoresponse represents one mole per hundred moles of photoconductor.

The mixture of solvent, resin, additive and photoconductor were charged into a ball mill and the operation continued until complete blending of all the ingredients was achieved, which required in the range of 20 to 24 hours.

The resulting blend was applied to a one mil thick Mylar base support which was treated with a conductive coating imparting a conductivity of $10^{-9}$ mohs per centimeter and at a rate sufficient to produce a photoconductive layer of 2 grams per square foot of base area and a thickness of 0.9–1.1 mils. The photoelectrostatic member was fully responsive to electromagnetic radiation in the visible range such as emitted by the General Electric T-3 tungsten lamp and evaluated to have a photosensitive response of 170 units.

Example V

A photoelectrostatic member of this example follows a preparation of Example IV with the exception that 18 grams (0.051 mole) of tetraphenylbutatriene was added to 2 grams of Pliolite S5D and 0.17 grams of 9-(dicyanomethylene)-2,4,7-trinitrofluorene. The amount of sensitizer added represents 1.0 mole sensitizer per 100 moles of the photoconductive material. The photoresponse of the instant example was rated at 150 units.

Example VI

A photoelectrostatic member was prepared by blending in 80 grams of toluene 10 grams (0.014 mole) of tetra-(m-bromophenyl) pentane, 10 grams of sytrene butadiene resin, and 0.05 gram of 9-(dicyanomethylene)-2,4,7-trinitrofluorene, 1 mole of sensitizer per 100 moles of photoconductor. The mixture was ball milled until the ingredients were blended approximately 24 hours.

The solution was then applied to a suitable conductive substrate at the rate of 4 grams per square foot on a polyester film base support yielding a dry coating thickness of 2 mils.

The photoresponse of this example was rated at 125 units.

Example VII

The photoelectrostatic member of this example was prepared by blending 10 grams of 1,4 bis(1,1-diphenyl-4-ethyl-4-butatrienyl)-benzene (.018 mole), 10 grams of Butvar B-76 which is a polyvinylbutyral manufactured by Monsanto Chemical Company and .065 gram of 9-(dicyanomethylene)-2,4,7-trinitrofluorene which represents 1 mole of sensitizer per 100 moles of organic photoconductor. The mixture was ball milled as described in the previous examples until complete blending was achieved and then applied to a paper substrate having a conductivity of $10^{-9}$ mhos per centimeter, and a caliper of 2.5 mils at a rate sufficient to produce a photoconductive layer thereon of 1.5 grams per square foot of base and a thickness in the range of 0.3 to 0.4 mil.

The class of organic photoconductive materials described herein produce photoconductive media which are reusable, produce high quality images, and allow transferability of the toner images from the photoconductive layer to plain paper and generally exhibit greater sensitivity than prior art organic photoconductive materials particularly when treated with a π-type additive.

Example VIII

A photoelectrostatic member was prepared by mixing 10 grams of 1,4-diphenyl-1,4-di-2-thienylbutatriene and 10 grams of styrene butadiene copolymer sold by Goodyear Tire and Rubber Company under the tradename of "Pliolite S5D" in 80 grams of toluene. To the mixture was next added a π-acid such as 9-(dicyanomethylene)-2,4,7-trinitrofluorene, in the amount of 0.098 gram which represented 1 mole sensitizer per 100 moles photoconductor.

The mixture was ball milled at room temperature until a homogeneous mixture was obtained which was then applied to a suitable conductive support material such as aluminized Mylar 5 mil thickness at a rate to produce a dry coating weight of 0.5 gram per square foot.

Photoresponse was 160 units.

Example IX

A photoconductive formulation was prepared by blending 5 grams of 1-(inden-1-ylidene)-3,3-diphenylpropadiene and 15 grams of polyvinyl formal available from the Polysciences, Inc., of Rydal, Pa. The materials were mixed with 80 grams of chlorobenzene. To this mixture was added 0.060 gram of 9-(dicyanomethylene)-2,4,7-trinitrofluorene. The amount of additive represents one mole per hundred moles of photoconductor.

The mixture of solvent, resin, additive and photoconductor were charged into a ball mill and the operation continued until complete blending of all the ingredients was achieved.

The resulting blend was applied to a one mil thick Mylar base support which was treated with a conductive coating imparting a conductivity of $10^{-9}$ mhos per centimeter and at a sufficient rate to produce a photoconductive layer of 2 grams per square foot of base area and thickness of 1.0 to 1.3 mils.

Photoresponse was 80 units.

Example X

The photoconductive member of this invention was prepared by combining 10 grams of 1.4 bis(1,1-di-4-bromophenyl-4-phenyl-4-butatrienyl)-benzene to 5 grams of Pliolite S5D and 0.08 gram of 2-phenyl-4-(2,4,5,7-tetranitro-9-fluorenylidene)-5-oxazolone. The amount of sensitizer added represents 1.5 mole sensitizer per 100 moles of photoconductive material.

The mixing and coating procedure followed the description in Example IV.

Photoresponse was 120 units.

Example XI

The photoconductive member of the invention follows the procedures set forth in Example VIII with the exception that 10 grams of 1,4-bis(1,1-diphenylbutatrienyl)-2-nitrobenzene was substituted for the 10 grams of 1,4-diphenyl-1,4-di-2-thienyl-butatriene.

Photoresponse was 110 units.

Example XII

A photoelectrostatic member was prepared by blending 80 grams of toluene, 10 grams of tetraphenylpentatetraene, 10 grams of styrene-butadiene resin and 0.56 gram of 2 - phenyl-4-(2,4-dinitro-9-fluorenylidene)-5-oxazolone as the sensitizers. The sensitizer represents 5 moles per 100 moles of the photoconductor.

The solution was then applied to a suitable conductive substrate at the rate to yield a dry coating weight of 4 grams per square foot on a polyester film base support yielding a dry coating thickness of 2 mls.

Photoresponse was 80 units.

Example XIII

The photoconductive member prepared in this example followed the procedure set forth in Example VII with the exception that 10 grams of 1,4-di(3-methylphenyl)-1,4-diphenylbutatriene was substituted for 1,4-bis(1,1-diphenyl-4-ethyl-4-butatrienyl)-benzene. In addition, 0.082 gram of 9-(dicyanomethylene)-2,7-dinitrofluorene was substituted for the 9-(dicyanomethylene)-2,4,7-trinitrofluorenone.

The amount of sensitizer was 1 mole per 100 moles photoconductor.

Photoresponse was 210 units.

Example XIV

The photoconductive member of this example was prepared following the formulation of Example IV with the exception that 5 grams of 1,4-diphenyl-1,4-di(4-phenylphenyl)-butatriene was substituted for the tetraphenyl butatriene. 0.041 gram of 2-phenyl-4-(2,4-dinitro-9-fluorenylidene)-5-oxazolone was substituted for the 9-(dicyanomethylene)-2,4,7-trinitrofluorene. The amount of sensitizer was 1 mole per 100 moles photoconductor.

The photoresponse was 190 units.

Example XV

The photoconductive member of this example was prepared following the procedures of Example VII with the exception that 10 grams of 1,4-di-2-naphthyl-1,4-diphenylbutatriene was substituted for 1,4-bis(1,1-diphenyl-4-ethyl-4 - butatrienyl) - benzene. The sensitizer used was 0.091 gram of 2-phenyl-4-(2,6-dinitro-9-fluorenylidene)-5-oxazolone in place of 9-(dicyanomethylene)-2,4,7-trinitrofluorene.

The amount of sensitized was 1 mole per 100 moles photoconductor.

Photoresponse was 200 units.

It will be obvious to those skilled in the art that many modifications may be made within the scope of the present invention without departing from the spirit thereof.

What is claimed is:

1. A photoelectrostatic member comprising a conductive base support having a photoconductive layer applied thereon comprising an organic photoconductive material dispersed in a resin binder said photoconductive material having one of the following general formulas:

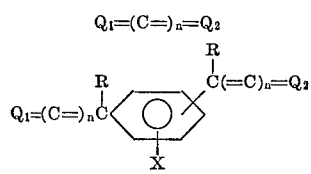

where X is alkyl, halogen, hydrogen, or nitrate, $n$ is an integer from 1 through 6; $Q_1$ and $Q_2$ can be:

indene, or fluorene; R representing lower alkyl, aryl or hydrogen; $R_1$ and $R_2$ can be aryl, substituted aryl, and when taken together represent the necessary atoms to form a fluorenylidene ring; and wherein $Q_1$, $Q_2$ or $R_1$ and $R_2$ can be the same or different.

2. The photoelectrostatic member of claim 1 wherein the photoconductive material comprises from 25% to 90% by weight of the total solids present in the photoconductive layer.

3. The photoelectrostatic member as claimed in claim 1 wherein the photoconductive layer includes a π-acid type sensitizer.

4. The photoelectrostatic member as claimed in claim 1 wherein the photoconductive material is bi-fluorenylidene-ethylene.

5. The photoelectrostatic member as claimed in claim 1 wherein the photoconductive material is tetraphenylhexapentene.

6. The photoelectrostatic member as claimed in claim 1 wherein the photoconductive material is tetraphenylbutatriene.

7. The photoelectrostatic member as claimed in claim 1 wherein said insulating resin binder is styrenebutadiene copolymer.

8. The photoelectrostatic member as claimed in claim 1 wherein the resin binder is polyvinyl formal.

9. The photoelectrostatic member as claimed in claim 1 wherein the resin binder is polyvinyl butyral.

References Cited

UNITED STATES PATENTS 3,287,119   11/1966   Hoegl _____ 96—1.5

FOREIGN PATENTS

41/18,467   10/1966   Japan _____ 103 K 14
1,010,237   11/1965   Great Britain.

OTHER REFERENCES

Chem. Abstracts, vol. 54, col. 1068(h).

DONALD LEVY, Primary Examiner

J. C. COOPER III, Assistant Examiner

U.S. Cl. X.R.

252—501; 260—668